(12) United States Patent
Raczek

(10) Patent No.: US 9,755,482 B2
(45) Date of Patent: Sep. 5, 2017

(54) ELECTRIC MACHINE WITH LIQUID COOLING AND METHOD OF ASSEMBLING

(71) Applicant: Regal Beloit America, Inc., Beloit, WI (US)

(72) Inventor: John Edward Raczek, Weston, WI (US)

(73) Assignee: Regal Beloit America, Inc., Beloit, WI (US)

( * ) Notice: Subject to any disclaimer, the term of this patent is extended or adjusted under 35 U.S.C. 154(b) by 687 days.

(21) Appl. No.: 13/796,281

(22) Filed: Mar. 12, 2013

(65) Prior Publication Data

US 2014/0265657 A1  Sep. 18, 2014

(51) Int. Cl.
   *H02K 9/19*  (2006.01)

(52) U.S. Cl.
   CPC ....................... *H02K 9/19* (2013.01)

(58) Field of Classification Search
   CPC .......................................... H02K 9/19
   USPC ................ 310/54, 52, 62, 64, 68 B
   See application file for complete search history.

(56) References Cited

U.S. PATENT DOCUMENTS

| | | | | |
|---|---|---|---|---|
| 2,917,644 | A * | 12/1959 | Laffoon et al. ................. | 310/64 |
| 3,218,825 | A * | 11/1965 | McClure ......................... | 62/505 |
| 3,388,559 | A * | 6/1968 | Johnson .......................... | 62/224 |
| 3,675,056 | A * | 7/1972 | Lenz ............................... | 310/54 |
| 4,747,276 | A * | 5/1988 | Kakinuma ............... | F04B 39/06 |
| | | | | 62/505 |
| 5,682,074 | A | 10/1997 | Di Pietro et al. | |
| 6,009,722 | A * | 1/2000 | Choi ...................... | F25B 31/006 |
| | | | | 310/54 |
| 7,411,323 | B2 * | 8/2008 | Pfannschmidt et al. ........ | 310/58 |
| 8,465,265 | B2 * | 6/2013 | de Larminat ......... | F04C 29/045 |
| | | | | 417/366 |
| 8,629,585 | B2 * | 1/2014 | Bradfield .................. | H02K 1/20 |
| | | | | 310/52 |
| 2003/0020339 | A1 * | 1/2003 | Ide ........................... | H02K 9/12 |
| | | | | 310/58 |
| 2004/0084974 | A1 * | 5/2004 | Nelson ..................... | H02K 9/06 |
| | | | | 310/58 |
| 2007/0278869 | A1 * | 12/2007 | Taketsuna ........................ | 310/54 |
| 2010/0215526 | A1 * | 8/2010 | Saari ........................ | H02K 9/04 |
| | | | | 417/423.8 |

(Continued)

FOREIGN PATENT DOCUMENTS

| | | |
|---|---|---|
| EP | 0148862 B1 | 8/1988 |
| EP | 1168571 A2 | 1/2002 |
| JP | 56136152 A * | 10/1981 |

OTHER PUBLICATIONS

Matsuura et al., English Translation of Abstract for JP 56136152 A, Oct. 24, 1981.*

(Continued)

*Primary Examiner* — Joshua Benitez Rosario
*Assistant Examiner* — Rashad Johnson
(74) *Attorney, Agent, or Firm* — Armstrong Teasdale LLP

(57) ABSTRACT

In one aspect, a stator for use in a liquid cooled electric machine having a rotor is provided. The stator includes a stator body having a radially outer periphery and a radially inner periphery, and at least one first coolant passage extending radially through the stator body from the outer periphery to the inner periphery. The at least one first coolant passage facilitates providing a coolant to an air gap defined between the stator body and the rotor.

19 Claims, 4 Drawing Sheets

(56) References Cited

U.S. PATENT DOCUMENTS

| | | | |
|---|---|---|---|
| 2011/0140551 A1* | 6/2011 | Adaniya et al. | 310/64 |
| 2012/0235521 A1 | 9/2012 | Cai et al. | |
| 2012/0261058 A1* | 10/2012 | Rippel | H02K 1/20 |
| | | | 156/182 |
| 2012/0267970 A1 | 10/2012 | Filip et al. | |
| 2012/0274159 A1* | 11/2012 | Le Besnerais | H02K 9/22 |
| | | | 310/54 |
| 2012/0286595 A1 | 11/2012 | Pal | |
| 2013/0221772 A1* | 8/2013 | Miyamoto | H02K 9/19 |
| | | | 310/54 |
| 2016/0190878 A1* | 6/2016 | Saari | H02K 1/20 |
| | | | 310/59 |

OTHER PUBLICATIONS

Matsuura et al., English Translation of JP 56136152 A, Oct. 24, 1981.*

* cited by examiner

ELECTRIC MACHINE WITH LIQUID COOLING AND METHOD OF ASSEMBLING

FEDERAL RESEARCH STATEMENT

This invention was made with Government support under Contract No. M6785410R5022, awarded by the Department of the Navy, and the Government may have certain rights in this invention.

BACKGROUND OF THE INVENTION

The field of the invention relates generally to electric machines and, more particularly, to a liquid cooled electric machine.

Electric machines such as motors and generators are used in many applications. However, there are still areas where the use of electric machines remains impractical, for example for use as the main drive of a vehicle such as an automobile or truck. Some known electric motors are generally too large and heavy and produce too little power for commercial use in such a vehicle.

One problem associated with electric machines is that it is necessary to cool them because they generate heat, which reduces their efficiency. Motor components such as the rotor, stator and stator windings are subjected to high temperatures and substantial thermal stresses. Accordingly, efficient motor cooling systems are necessary to prevent overheating of the motor components and to improve the overall electrical and mechanical performance of the motor. Some known electrical machines may be air cooled by blowing air through or over them, and other machines may be liquid cooled by spraying oil onto the rotor and stator assemblies or by directing oil through a shaft of the motor.

BRIEF DESCRIPTION OF THE INVENTION

In one aspect, a stator for use in a liquid cooled electric machine having a rotor is provided. The stator includes a stator body having a radially outer periphery and a radially inner periphery, and at least one first coolant passage extending radially through the stator body from the outer periphery to the inner periphery. The at least one first coolant passage facilitates providing a coolant to an air gap defined between the stator body and the rotor.

In another aspect, a liquid cooled electric machine is provided. The electric machine includes a housing, a shaft rotatably coupled to the housing, a rotor coupled to the shaft, and a stator at least partially surrounding the rotor and defining an air gap between the stator and the rotor. The stator includes a stator body having a radially outer periphery, a radially inner periphery, and at least one coolant passage extending radially therebetween. The at least one first coolant passage facilitates providing a coolant to the air gap.

In yet another aspect, a method of assembling a liquid cooled electric machine is provided. The method includes providing a housing, rotatably coupling a shaft to the housing, and coupling a rotor to the shaft. The method further includes orienting a stator to at least partially surround the rotor to define an air gap therebetween, the stator including a stator body having a radially outer periphery and a radially inner periphery, and forming at least one first coolant passage in the stator body, the at least one first coolant passage extending radially between the radially outer periphery and the radially inner periphery. The at least one first coolant passage facilitates providing a coolant to the air gap.

In yet another aspect, a stator for use in a liquid cooled electric machine having a rotor is provided. The electric machine includes a stator body having a radially outer periphery, a radially inner periphery, a first end face, and a second end face. The first end face is configured for orientation adjacent to an end face of the rotor. The machine further includes at least one first coolant passage extending axially through the stator body from the first end face to the second end face. The at least one first coolant passage facilitates providing a coolant to an air gap defined between the stator first end face and the rotor end face.

DETAILED DESCRIPTION OF THE INVENTION

During operation of an electric machine, heat is generated mainly from current flowing through the electrical conductors and magnetic flux flowing through metal. Such heat generation is typically concentrated within an air gap region between a stator and a rotor of the electric machine. This disclosure provides systems and methods for supplying a liquid coolant to the air gap region to cool the electric machine during operation.

Figure 1:
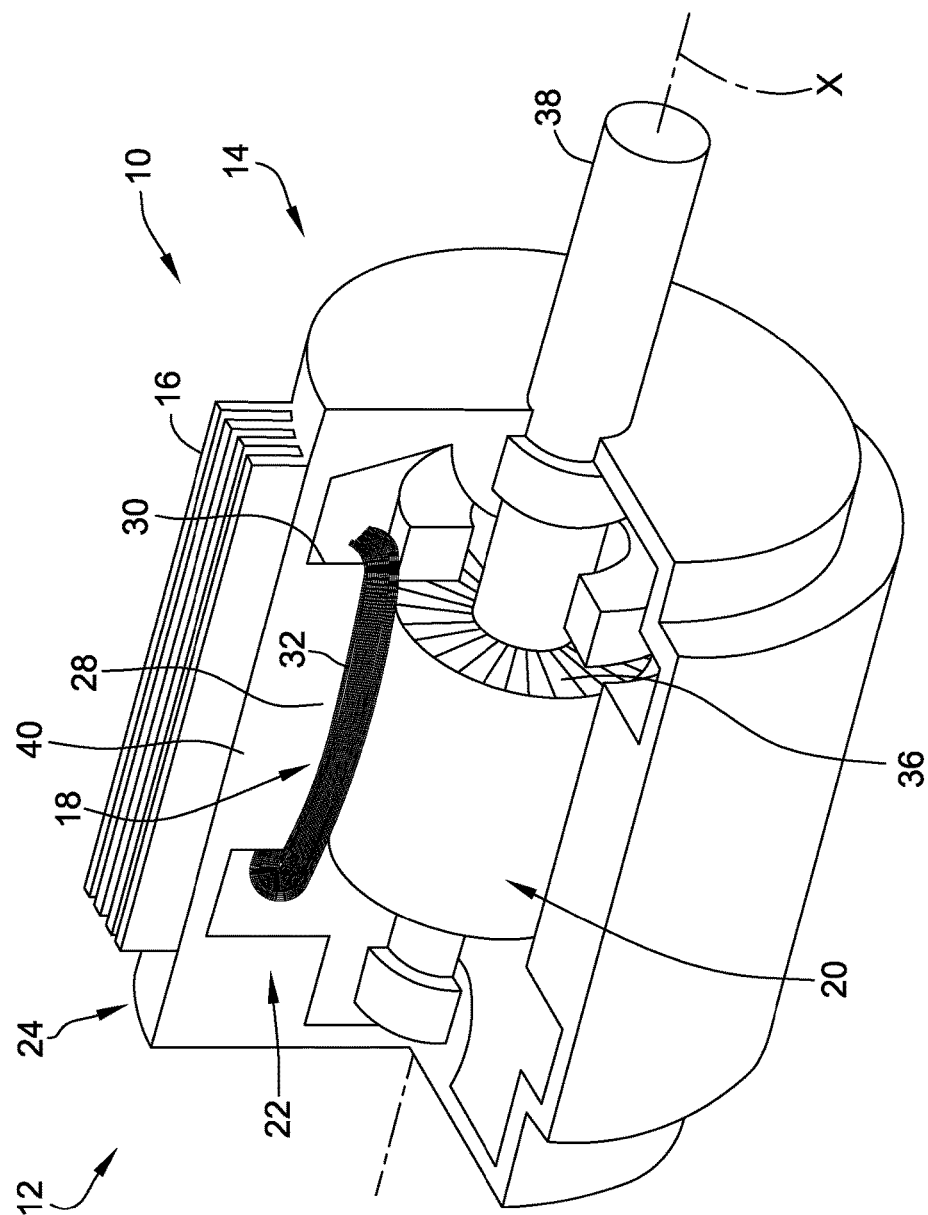
FIG. 1 is a simplified perspective cut-away view of an exemplary electric machine.

FIG. 1 is a perspective cut-away view of a simplified exemplary electric machine referred to herein as electric motor 10. Although referred to herein as electric motor 10, electric motor 10 can be operated as either a generator or a motor. Electric motor 10 includes a first end 12, a second end 14, and a motor assembly housing 16. Electric motor 10 also includes a stationary assembly 18 and a rotatable assembly 20. Motor assembly housing 16 defines an interior 22 and an exterior 24 of motor 10 and is configured to at least partially enclose and protect stationary assembly 18 and rotatable assembly 20. Stationary assembly includes a stator core 28, which includes a plurality of teeth 30 extending from a stator body 40, and a plurality of windings 32 wound around stator teeth 30. Stator core 28 may include any number of teeth that enables motor 10 to function as described herein. Furthermore, in an exemplary embodiment, stator core 28 is formed from a stack of laminations made of highly magnetically permeable material. Alternatively, stator core 28 is a solid core. Stationary assembly 18 may be a round, segmented, or roll-up type stator construction and windings 32 are wound on stator core 28 in any suitable manner that enables motor 10 to function as described herein. For example, windings 32 may be concentrated type or overlapped type windings.

Rotatable assembly 20 includes a rotor core 36 and a shaft 38. In the exemplary embodiment, rotor core 36 is formed from a stack of laminations made of magnetically permeable material. Alternatively, rotor core 36 is a solid core. Rotor core 36 includes a plurality of permanent magnets (not shown) and is substantially received in a central bore of stator core 28 for rotation along an axis of rotation X. FIG. 1 illustrates rotor core 36 and stator core 28 as solid for simplicity. While FIG. 1 is an illustration of a three phase electric motor, the methods and apparatus described herein may be included within motors having any number of phases, including single phase and multiple phase electric motors.

Figure 2:
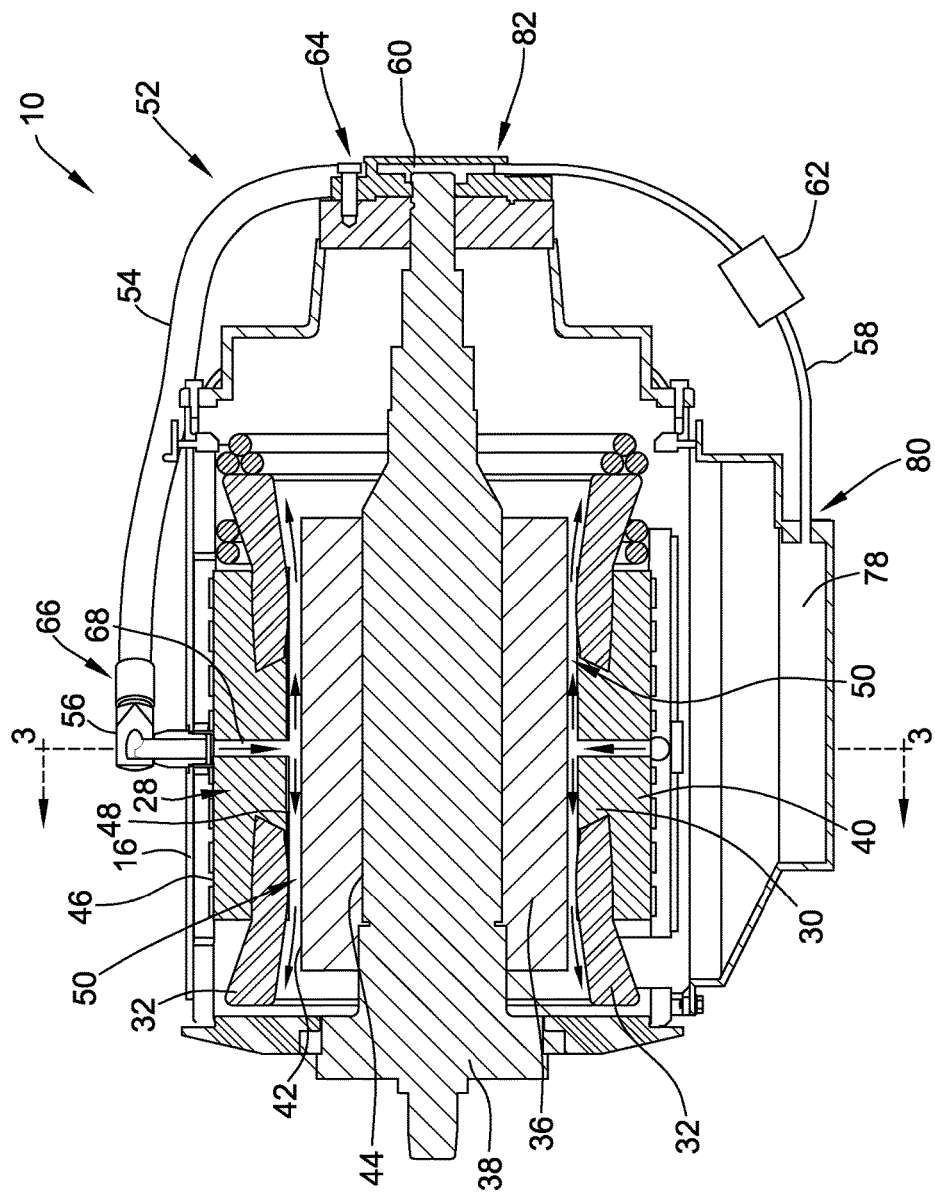
FIG. 2 is a cross-sectional view of another exemplary electric machine.
Figure 3:
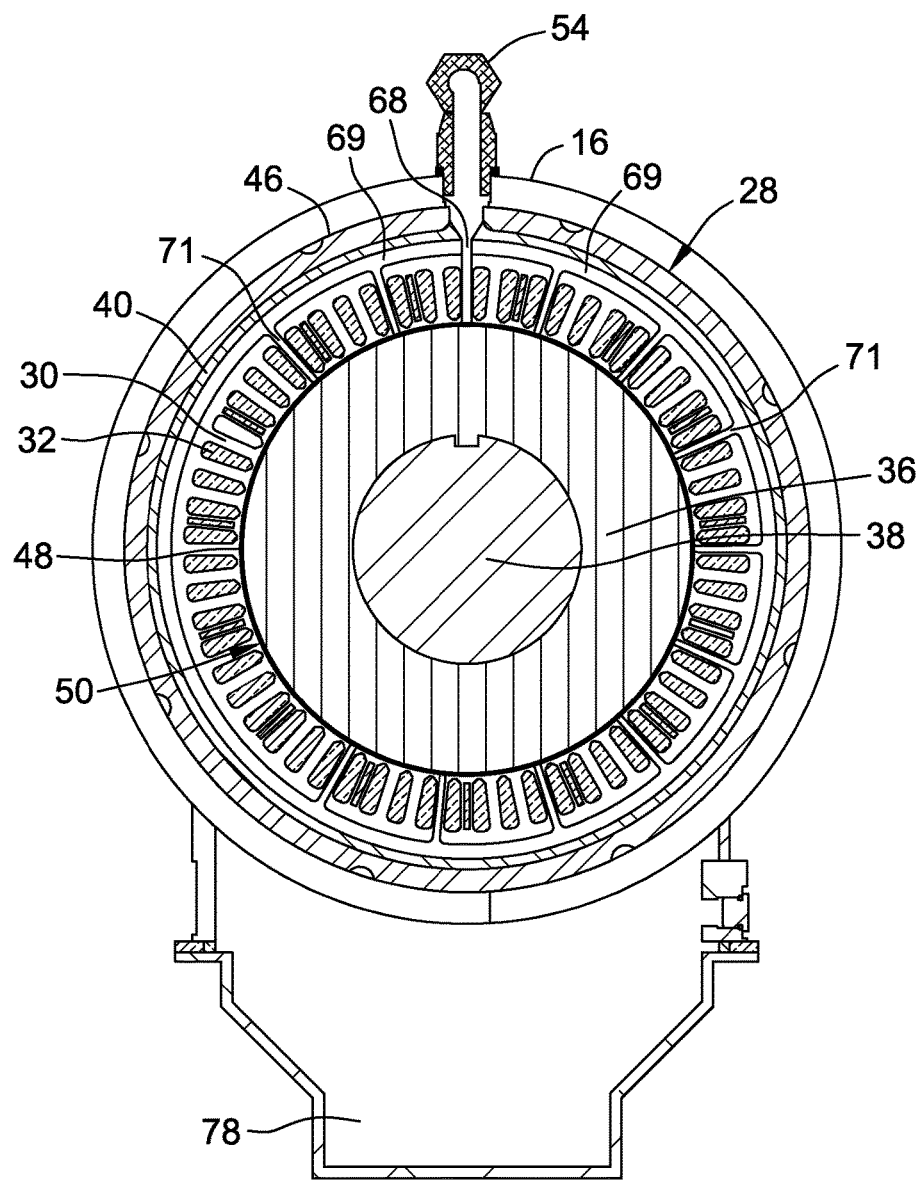
FIG. 3 is a cross-sectional view of the electric machine shown in FIG. 2 and taken along line 3-3.

FIG. 2 is a cross-sectional view of an exemplary embodiment of electric motor 10 that includes stator core 28 at least partially surrounding rotor core 36 in a horizontal radial flux configuration, and FIG. 3 is a cross-sectional view of the electric motor shown in FIG. 2 and taken along line 3-3. Alternatively, electric motor 10 may be oriented in an axial flux and/or vertical configuration. Rotor core 36 includes an outer periphery 42 and an inner periphery 44 coupled to shaft 38, and stator core 28 includes an outer periphery 46 and an inner periphery 48 defined by the ends of stator teeth 30. Stator core 28 is positioned around rotor core 36 such that stator inner periphery 48 and rotor outer periphery 42 define an air gap 50 therebetween. During operation of motor 10, heat is generated from current flowing through electrical conductors of the motor (e.g., windings 32) and from magnetic flux flowing through stator core 28 and rotor core 36. Such heat generation is typically concentrated in the area of air gap 50.

In the exemplary embodiment, electric motor 10 includes a liquid coolant system 52 for circulating a liquid coolant to cool electric motor 10 during operation. In particular, liquid coolant system 52 circulates the liquid coolant to cool air gap 50 and the surrounding area. Coolant system 52 generally includes a coolant line 54, a manifold 56, a return line 58, a pump 60, and a heat exchanger 62. In the exemplary embodiment, housing 16 includes a reservoir 78 to hold an amount of the liquid coolant. Reservoir 78 is generally located at a bottom portion of housing 16 so that liquid coolant circulated into housing interior 22 returns to reservoir 78 by gravity. Return line 58 includes a first end 80 fluidly coupled to reservoir 78 and a second end 82 fluidly coupled to coolant line 54, and heat exchanger 62 is thermally coupled to return line 58. As such, heat exchanger 62 cools the liquid coolant flowing through return line 58 from reservoir 78 to coolant line 54. In the exemplary embodiment, heat exchanger 62 indirectly exchanges heat in the liquid coolant with any suitable heat transfer fluid. For example, heat exchanger 62 may be thermally coupled to a vehicle engine cooling system such as a radiator coolant line. Alternatively, heat exchanger 62 may be coupled to reservoir 78 or coolant line 54.

Coolant line 54 includes a first end 64 fluidly coupled to return line second end 82 and a second end 66 coupled to manifold 56. Manifold 56 extends through housing 16 and is fluidly coupled to a coolant passage 68 formed in stator core 28. In the exemplary embodiment, coolant passage 68 is formed through stator core 28 such that coolant passage 68 extends generally radially from stator outer periphery 46 to stator inner periphery 48. As such, coolant passage 68 extends through stator body 40 and stator teeth 30 to air gap 50.

As shown in FIG. 3, stator core 28 includes a coolant passage 69 extending generally annularly about stator core 28 and fluidly coupled to coolant passage 68 to supply the liquid coolant throughout stator core 28. A plurality of secondary coolant passages 71 are fluidly coupled to coolant passage 69 and extend generally radially from coolant passage 69 through stator tooth 30 to stator inner periphery 48. As such, the liquid coolant supplied to coolant passage 68 is distributed throughout stator core 28 and around the circumference of air gap 50 via coolant passages 69 and 71. In the exemplary embodiment, one secondary cooling passage 71 is generally formed through every third stator tooth 30. However, any number and pattern of secondary cooling passages 71 may be formed in stator 28 that enables machine 10 to function as described herein.

Figure 4:
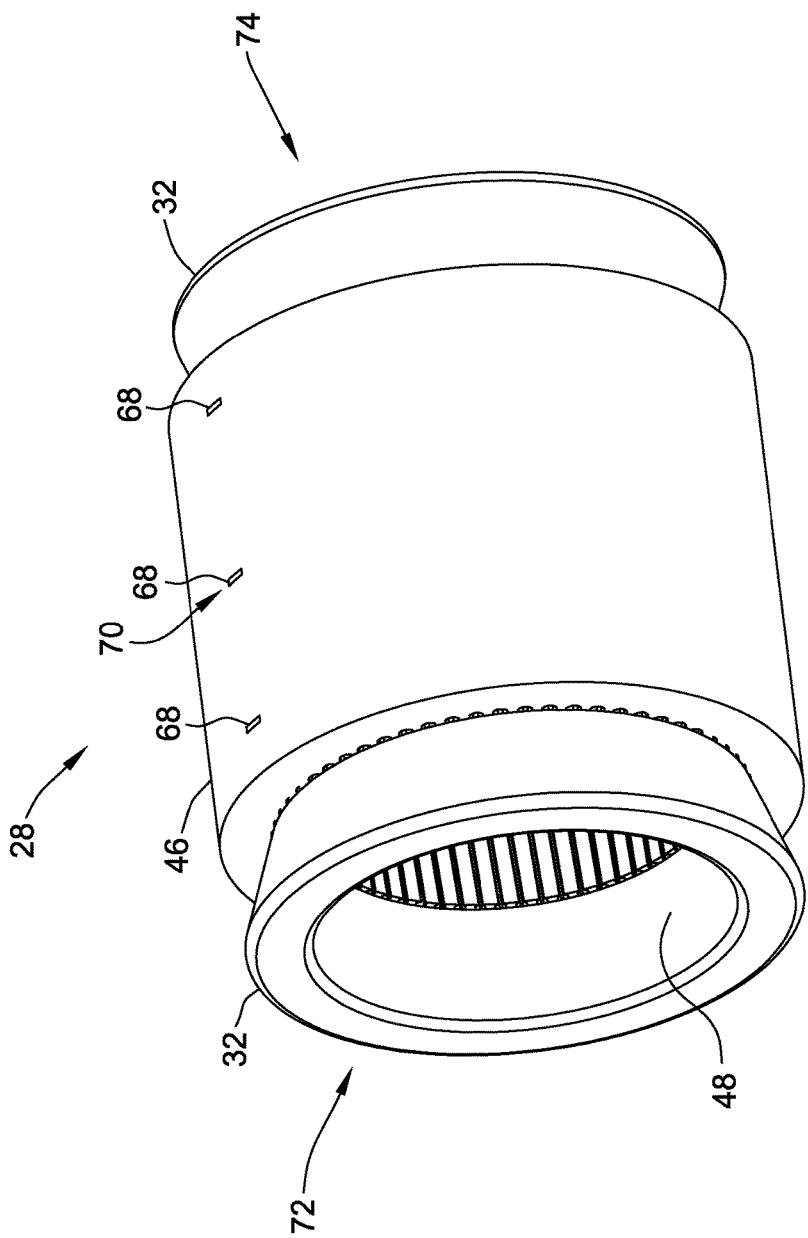
FIG. 4 is a perspective view of an exemplary stator core that may be used in the electric machines shown in FIGS. 1 and 2.

In the exemplary embodiment, coolant passage 68 is oriented substantially at a midpoint 70 between a stator first end 72 and a stator second end 74. It should be noted that coolant passages 68 may be formed through stator core 28 at any location between stator first end 72 and second end 74. For example, as shown in FIG. 4, stator core 28 includes three coolant passages 68 formed through stator core 28. In alternative embodiments, stator core 28 may have any desired number and orientation of coolant passages 68. Manifold 56 is accordingly modified to fluidly couple coolant line 54 to any number of coolant passages 68. For example, manifold 56 may extend through housing 16 in multiple locations (not shown). However, manifold 56 may have any configuration that enables coolant system 52 to fluidly connect to multiple coolant passages 68.

In the exemplary embodiment, pump 60 is coupled to coolant line 54 and operates to pump the liquid coolant into coolant passages 68, 69 and 71, and subsequently into air gap 50. In the exemplary embodiment, pump 60 is at least partially operated a shaft gear (not shown) coupled to shaft 38, and rotation of shaft 38 causes the coolant to be pumped through coolant line 54 and through coolant passages 68. Alternatively, pump 60 is a gerotor-type pump. Alternatively still, any suitable pump may be coupled to coolant line 54 or return line 58 to circulate coolant through coolant system 52. Liquid coolant exits coolant passages 68 at stator inner periphery 48 into air gap 50 and travels outward toward stator ends 72 and 74 as indicated by arrows in FIG. 2. By locating at least one coolant passage 68 at stator midpoint 70, coolant flows along substantially the entire length of air gap 50 between stator ends 72 and 74 to cool substantially the entire surface area of stator inner periphery 48 and rotor outer periphery 42. Moreover, due to rotation of rotor core 36, the coolant is propelled onto stator core 28 including windings 32, as well as an inner surface of housing 16 and other components therein. As such, motor 10 and its components are effectively cooled by the coolant that is supplied to air gap 50 and dispersed throughout the housing interior 22.

During operation of electric machine 10, electrical conductors such as windings 32, stator core 28, and other machine components generate heat. Pump 60 pumps a liquid coolant from reservoir 78 through return line 58 and into heat exchanger 62. The liquid coolant is cooled in heat exchanger 62 and is pumped through coolant line 54 into manifold 56. Alternatively, the liquid coolant may be provided to coolant line 54 by a source different from reservoir 78. The liquid coolant is pumped through radially extending coolant passages 68 and 71 and into air gap 50. The liquid coolant travels outward from coolant passages 68 toward stator ends 72 and 74 while contacting and cooling stator core 28, windings 32, and rotor core 36. In addition, rotation of rotor core 36 propels the liquid coolant throughout housing interior 22 and cools other internal components. The heated liquid coolant is then returned by gravity to reservoir 78 for recycling back through coolant system 52.

An exemplary method of assembling electrical machine 10 is described herein. The method includes providing housing 16 having reservoir 78 and rotatably coupling shaft 38 to housing 16. Rotor core 36 is coupled to shaft 38 and stator core 28 is oriented to at least partially surround rotor core 36 to define air gap 50 therebetween. At least one coolant passage 68 is formed radially through stator core 28 from stator outer periphery 46 to stator inner periphery 48. Coolant passage 69 is formed generally circumferentially through stator core 28 and is fluidly coupled to coolant passage 68. At least one secondary coolant passage 71 is formed radially through stator core 28 from coolant passage 69 to stator inner periphery 48 and is fluidly coupled to coolant passage 69. In the exemplary embodiment, coolant passage 68 is located substantially at midpoint 70 between stator first end 72 and stator second end 74 to facilitate providing the longest path for the liquid coolant to travel outward to stators ends 72 and 74. Return line 58 is fluidly coupled between reservoir 78 and coolant line 54. Manifold 56 is fluidly coupled to coolant passages 68 and 71, and coolant line 54 is coupled to manifold 56. Heat exchanger 62 is coupled to at least one of reservoir 78, return line 58, and coolant line 54 to facilitate cooling heated liquid coolant therein. Pump 60 is coupled to at least one of return line 58 and coolant line 54 to circulate liquid coolant therethrough for providing coolant to the area of air gap 50 and to other components located within housing interior 22.

Described herein are systems and methods for liquid cooling an electric machine such as a motor or a generator. The electric machine includes a stator having radially extending cooling passages that provide a liquid coolant into the air gap region between the stator and rotor. A liquid coolant system circulates and recycles the liquid coolant to the radial cooling passages where the coolant is slung onto heat generating components of the electric machine. The increased cooling capacity provided by the liquid coolant system increases the electric machine capacity and enables the machine to be smaller and lighter than typical air-cooled machines. For example, the electric machine described herein is particularly well-suited for vehicle engine applications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A stator for use in a liquid cooled electric machine having a rotor, said stator comprising:
   a stator body having an outer periphery and an inner periphery;
   at least one first coolant passage extending radially through said stator body from said outer periphery to said inner periphery, wherein said at least one first coolant passage facilitates providing a coolant to an air gap defined between said stator body and the rotor;
   at least one second coolant passage extending radially through said stator body; and
   at least one third coolant passage extending substantially annularly through said stator body intermediate the outer periphery and the inner periphery from said at least one first coolant passage to said at least one second coolant passage, wherein said at least one third coolant passage is fluidly coupled to said at least one first coolant passage and said at least one second coolant passage, said at least one second coolant passage extending from said at least one third coolant passage to said inner periphery.

2. The stator of claim 1, wherein said stator body has a first end and a second end, and wherein said at least one first coolant passage is oriented substantially at a midpoint between said first and second ends.

3. The stator of claim 1, wherein said at least one first coolant passage comprises a plurality of coolant passages extending radially through said stator body from said outer periphery to said inner periphery.

4. The stator of claim 1, wherein said at least one third passage extends annularly about the entirety of said stator body.

5. A liquid cooled electric machine comprising:
   a housing;
   a shaft rotatably coupled to said housing;
   a rotor coupled to said shaft;
   a stator at least partially surrounding said rotor and defining an air gap between said stator and said rotor, said stator comprising:
      a stator body having an outer periphery and an inner periphery;
      at least one first coolant passage extending radially through said stator body from said outer periphery to said inner periphery, wherein said at least one first coolant passage facilitates providing a coolant to the air gap;
      at least one second coolant passage extending radially through said stator body; and
      at least one third coolant passage extending substantially annularly through said stator body intermediate the outer periphery and the inner periphery from said at least one first coolant passage to said at least one second coolant passage, wherein said at least one third coolant passage is fluidly coupled to said at least one first coolant passage and said at least one second coolant passage, said at least one second coolant passage extending from said at least one third coolant passage to said inner periphery; and
   a manifold fluidly coupled to said at least one first coolant passage, said manifold configured to deliver coolant to said at least one first coolant passage.

6. The electric machine of claim 5, wherein said stator body includes a first end and a second end, and wherein said at least one first coolant passage is oriented substantially at a midpoint of the length between said first and second ends.

7. The electric machine of claim 5, further comprising a coolant line coupled to said manifold, wherein said coolant line facilitates providing the coolant to said at least one first coolant passage through said manifold.

8. The electric machine of claim 7, wherein said housing comprises a reservoir to collect the coolant provided to said air gap.

9. The electric machine of claim 8, further comprising a return line coupled to said reservoir and said coolant line, wherein said return line facilitates recycling coolant back through said coolant line to said at least one first coolant passage.

10. The electric machine of claim 9, further comprising a pump coupled to at least one of said coolant line and said return line, wherein said pump facilitates forcing the coolant into said at least one first coolant passage and said air gap.

11. The electric machine of claim 10, wherein said pump is integrated into said shaft such that rotation of said shaft facilitates pumping the coolant into said at least one first coolant passage and said air gap.

12. The electric machine of claim 8, further comprising a heat exchanger coupled to at least one of said housing, said coolant line, and said return line, said heat exchanger facilitating cooling the coolant.

13. The electric machine of claim 12, wherein said electric machine is configured to thermally couple to a vehicle engine cooling system.

14. A method of assembling a liquid cooled electric machine, said method comprising:
    providing a housing;
    rotatably coupling a shaft to the housing;
    coupling a rotor to the shaft;
    orienting a stator to at least partially surround the rotor to define an air gap therebetween, the stator including a stator body having an outer periphery and an inner periphery;
    forming at least one first coolant passage in the stator body, the at least one first coolant passage extending radially between the outer periphery and the inner periphery, wherein the at least one first coolant passage facilitates providing a coolant to the air gap;
    forming at least one second coolant passage in the stator body, the at least one second coolant passage extending radially through the stator body;
    forming at least one third coolant passage in the stator body, the at least one third coolant passage extending substantially annularly through the stator body intermediate the inner periphery and the outer periphery from the at least one first coolant passage to the at least one second coolant passage, wherein the at least one third coolant passage is fluidly coupled to the at least one first coolant passage and the at least one second coolant passage, the at least one second coolant passage extending from the at least one third coolant passage to the inner periphery; and
    coupling a manifold to the first coolant passage in fluid communication with the at least one first coolant passage such that the manifold is configured to deliver coolant to the at least one first coolant passage.

15. The method of claim 14, further comprising coupling a coolant line to the manifold, the coolant line configured to supply the coolant to the at least one first coolant passage through the manifold.

16. The method of claim 15, wherein the housing includes a reservoir for collecting the coolant from the air gap, further comprising coupling a return line between the reservoir and the coolant line to recycle coolant back to the at least one first coolant passage.

17. The method of claim 15, further comprising coupling a pump to the coolant line, wherein the pump facilitates forcing the coolant into the at least one first coolant passage and the air gap.

18. The method of claim 16, further comprising coupling a heat exchanger to at least one of the housing, the coolant line, and the return line, the heat exchanger facilitating cooling the coolant after heating in the air gap.

19. A stator for use in a liquid cooled electric machine having a rotor, said stator comprising:
    a stator body having an outer periphery, an inner periphery, a first end face, and a second end face, said first end face configured for orientation adjacent to an end face of the rotor;
    at least one first coolant passage extending through said stator body, wherein said at least one first coolant passage facilitates providing a coolant to an air gap defined between said stator first end face and the rotor end face;
    at least one second coolant passage extending radially through said stator body from said outer periphery to said inner periphery; and
    at least one third coolant passage extending through the stator body intermediate the outer periphery and the inner periphery, said at least one third coolant passage extending substantially annularly about the entirety of said stator body, wherein said at least one third coolant passage is fluidly coupled to said at least one first coolant passage and said at least one second coolant passage, said at least one second coolant passage extending from said at least one third coolant passage to said inner periphery.

* * * * *